Patented Dec. 13, 1949

2,491,397

UNITED STATES PATENT OFFICE 2,491,397

STABILIZATION OF ORGANIC PEROXIDES

Henry C. Stevens, Akron, Ohio, assignor to Pittsburgh Plate Glass Company, Allegheny County, Pa., a corporation of Pennsylvania No Drawing. Application October 4, 1944,
Serial No. 557,235

2 Claims. (Cl. 260—453)

The invention relates to a new method of preventing the decomposition of liquid organic peroxydicarbonates and to the novel compositions thereby produced.

Liquid peroxydicarbonates, are subject to a slow exothermic decomposition at normal room temperatures. Unless stored under conditions which facilitate the removal of the heat of decomposition a gradual increase in temperature may occur within the body of the peroxide. At the higher temperature the decomposition is increased, thereby resulting in a progressively more rapid elevation in temperature until the entire mass decomposes with explosive violence.

One purpose of my invention is to prevent the explosive decomposition and thereby avoiding the danger to life and property. A further purpose is to provide a method of preparing these liquid organic peroxides in larger lots than heretofore possible and to store these peroxides safely until needed. A still further purpose is to provide a method of making readily decomposable liquid peroxides available for catalyzing the polymerization of ethylenic compounds.

I have discovered that liquid organic peroxy compounds, which decompose with explosive violence when confined in closed containers, may be retained in stable form when intimately contacted with air or oxygen. This stabilizing effect may be noticed when the liquid peroxide is stored in thin layers in large shallow pans. Similarly, a very pronounced and remarkable stabilization can be obtained by adsorbing the peroxide on the surface of a fibrous material or other porous substance having a large area exposed to the atmosphere. I prefer to practice my invention by stirring the peroxide in an open vessel to afford periodic contact of all parts of the liquid with the oxygen containing atmosphere above it. Another effective method of practicing this invention is to bubble air or oxygen through the liquid, preferably when stored in a tall narrow container. Obviously a combination of stirring and air bubbling is very effective since it provides a method of distributing air through all parts of the body of a liquid peroxide and maintaining continuous contact of oxygen and the peroxide.

This invention is based on a true stabilization phenomenon and is not merely a means of dispersing the heat of reaction, thereby avoiding local areas of increased temperature. This fact can be conclusively proved by passing streams of air and carbon dioxide through separate vessels containing liquid peroxides. It will be found that the peroxide treated with carbon dioxide will not be stabilized while the air treated sample will last almost indefinitely (see Example I below).

Since the liquid peroxides exert a vapor pressure, the air bubbling method may cause a loss of peroxide through evaporation. This method, however, may actually cause an increase in the concentration of the peroxide due to the more rapid evaporation of the impurities, such as ethers and alcohols, which may result from the normal slow decomposition of the liquid organic peroxides.

In accordance with my invention, liquid peroxide catalysts, such as ethyl peroxydicarbonate, may be prepared in large lots and stored until required. Thus, danger of explosion ordinarily encountered in large scale preparations is avoided. The peroxide may be stored in the reaction vessel in which it is prepared merely by introducing an agitator or a device for simultaneous agitating and introducing a stream of oxygen containing gas.

In the normal use of liquid peroxides, the ethylenic compound is mixed with peroxide in advance. This may result in polymerization before the casting or impregnation operations are completed. Thus, the liquid resin may be lost or the operations greatly inconvenienced by the increased viscosity of the polymerizing resin. In accordance with this invention, the monomer with the liquid peroxide incorporated may be agitated or otherwise treated with an oxygen containing gas. The intimate contact of oxygen with the peroxy catalyst stabilizes the catalyst and prevents the polymerization. When the polymerization reaction is desired the agitation or air stream is interrupted.

Further details of the invention will be apparent from the following examples:

Example I

A 5 gm. sample of isopropyl peroxydicarbonate was placed in each of three test-tubes. Air was passed into one at the rate of 2 bubbles per second and carbon dioxide was introduced into the second at the same rate. The third sample was used as a blank. In eleven minutes the third sample decomposed explosively and the carbon dioxide treated sample similarly decomposed in fourteen minutes. The air blown sample was still in good condition after 180 minutes.

Example II

A 200 gm. quantity of ethylperoxydicarbonate (98.9 percent) was placed in a 1000 cc. evaporating dish and stirred vigorously at 25° C. for ten hours. After four hours the sample contained 97.5 percent and after ten hours, 97.6 percent of the ethyl peroxydicarbonate. No decomposition or increase in temperature was noted. A five gram sample in a closed test-tube decomposed with explosive violence in eight minutes.

*Example III*

A vertical cylindrical vessel 5 inches in diameter by 18 inches in height was filled with isopropyl peroxydicarbonate and stirred with an anchor type stirring rod constructed of glass tubing. A stream of air was passed through the hollow stirrer and thereby mixed with the peroxydicarbonate. During a five hour period the peroxydicarbonate content did not change and only one half of one percent by weight was lost through evaporation.

*Example IV*

A 2000 cc. quantity of diallyl phthalate was mixed with 20 grams of ethyl peroxydicarbonate. The mixture was maintained in an unpolymerized condition for three days by bubbling air through it while stirring vigorously. A five gram sample in a closed test-tube polymerized to a stiff gel in the same period of time.

Although the invention has been described with respect to specific embodiments it is not intended that the details thereof shall be limitations upon the scope of the invention except as included in the appended claims.

What I claim is:

1. A method of stabilizing a liquid peroxydicarbonate which comprises stirring the peroxy dicarbonate vigorously while exposed to gas containing oxygen in elemental state.

2. A method of stabilizing a liquid peroxydicarbonate which comprises passing a stream of gas containing oxygen in elemental state through a body of said peroxy dicarbonate.

HENRY C. STEVENS.

REFERENCES CITED

The following references are of record in the file of this patent:

UNITED STATES PATENTS

| Number | Name | Date |
|---|---|---|
| 1,924,786 | Hartman | Aug. 29, 1933 |
| 2,115,206 | Milas | Apr. 26, 1938 |
| 2,115,207 | Milas | Apr. 26, 1938 |
| 2,133,733 | Moser | Oct. 18, 1938 |
| 2,136,349 | Wiley | Nov. 8, 1938 |
| 2,319,576 | Agens | May 18, 1943 |
| 2,355,319 | Morris | Aug. 8, 1944 |
| 2,369,520 | Barnes | Feb. 13, 1945 |
| 2,370,588 | Strain | Feb. 27, 1945 |